United States Patent [19]

Choi

[11] Patent Number: 5,235,431
[45] Date of Patent: Aug. 10, 1993

[54] CIRCUIT USED IN A CAMCORDER FOR MONITORING THE RECORDED STATE OF A TAPE DURING RECORDING BY SIMULTANEOUS PLAYING BACK OF THE TAPE

[75] Inventor: Joon H. Choi, Kyungki-Do, Rep. of Korea

[73] Assignee: Goldstar Co., Ltd., Seoul, Rep. of Korea

[21] Appl. No.: 815,228

[22] Filed: Dec. 31, 1991

[30] Foreign Application Priority Data

Dec. 31, 1990 [KR] Rep. of Korea .................. 90-22772

[51] Int. Cl.⁵ .............................................. H04N 9/79
[52] U.S. Cl. .................................. 358/310; 358/327; 358/312; 360/64; 360/31
[58] Field of Search .............. 358/310, 335, 906, 909, 358/312, 327, 334, 330; 360/31, 64, 55, 61, 62, 63

[56] References Cited

U.S. PATENT DOCUMENTS

| | | | |
|---|---|---|---|
| 3,524,012 | 1/1967 | Kihara ................................ | 358/334 |
| 4,669,002 | 5/1987 | Nishioka et al. ..................... | 360/64 |
| 4,686,584 | 8/1987 | Kojima et al. ...................... | 360/10.3 |
| 5,023,731 | 6/1991 | Morisaki .............................. | 360/64 |

*Primary Examiner*—Tommy P. Chin
*Assistant Examiner*—Robert Chevalier
*Attorney, Agent, or Firm*—Morgan & Finnegan

[57] ABSTRACT

A circuit used in a camcorder for monitoring the recorded state of a tape during recording by simultaneous playing back of the tape comprising first and second record/playback heads mounted on a head and drum assembly for performing a record and playback of the tape, a second amplifier for amplifying the signals of the first and second heads received via switches to produce chrominance record signals, third and fourth playback only heads mounted on the head and drum assembly between the first and second heads with a given interval for exclusively performing the simultaneous playing back, first and third amplifiers connected with the third and fourth heads via switches for amplifying the video signals picked up by the third and fourth heads, third and fourth switches for respectively connecting the signals of the third and fourth heads to the first and third amplifiers, or the output signals of the first and second heads selected by first and second switches to a second amplifier, and a head switching means for selectively switching the output signals of the first and third amplifiers.

5 Claims, 5 Drawing Sheets

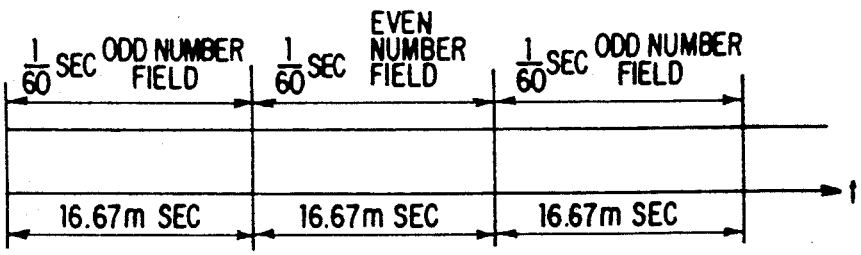
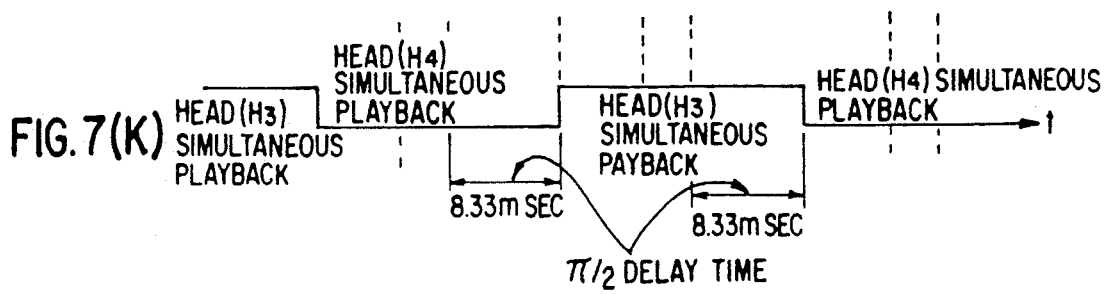

CIRCUIT USED IN A CAMCORDER FOR MONITORING THE RECORDED STATE OF A TAPE DURING RECORDING BY SIMULTANEOUS PLAYING BACK OF THE TAPE

FIELD OF THE INVENTION

The present invention concerns a circuit used in a camcorder for monitoring the recorded state of a tape during recording by simultaneous playing back of the tape in order to prevent possible recording errors.

TECHNICAL BACKGROUND

In a conventional camcorder, the recorded state of a tape may be checked out only by playing back of the tape. Namely, the recorded state of a tape may not possibly be checked out during recording.

Referring to FIG. 1, the image signals originating from an object are transmitted through lens 20 to charge coupled devices (not shown) to convert the image signals into electrical signals that are processed by an image processor 22 to produce the image signals of EE mode through audio/video output terminals. In addition, the image signals of EE mode are monitored by an electronic viewfinder 23.

In such a conventional camcorder, it is impossible to check out during recording the noises that may be recorded on the tape together with the desired signals, caused by foreign matters attached on the record head or others, because the electronic viewfinder only provides the visual images directly taken from the object. Namely, it is impossible to check out the recorded state of the tape during recording. In order to check out the noises recorded on the tape, the recording mode of the camcorder is temporarily stopped, and the reviewing mode is performed. However, this may cause the failure of an important record timing, and does not resolve the record troubles caused by foreign matters attached on the record head after the reviewing of the tape.

As shown in FIGS. 2 and 3, when the tape wound around the head drum with an envelope angle of 180°+θ° runs from left to right with magnets sensing positions to produce head switching signals, the record head Ha and the playback head Hb alternately and sequentially scan the recorded track from the first track "a" and the 14th track "n" to play back the recorded image signals. Of course, the playback of the recorded image signals is possibly performed only after rewinding the recorded tape.

Thus, the conventional camcorder does not have means for checking out the recorded state of the tape without stopping the recording operation, so that it is impossible to immediately prevent recording errors occurring during the recording operation.

SUMMARY OF THE INVENTION

It is an object of the present invention to provide means for checking out the recorded state of a tape without stopping the recording operation of a camcorder.

It is another object of the present invention to provide means for immediately preventing the recording errors occurring during the recording operation of a camcorder caused by the foreign matters attached on the head, etc.

According to the present invention, a camcorder for monitoring the recorded state of a tape during recording by simultaneous playing back of the tape comprises first and second record/playback heads for performing a record and playback of the tape, third and fourth heads arranged between the first and second heads with a given interval for exclusively performing the simultaneous playing back, first and second magnet means for generating the switching signals of the third and fourth heads, whereby playing back the tape occurs by the third and fourth heads simultaneously with the recording.

The present invention will now be described more specifically with reference to the drawings attached only by way of example.

BRIEF DESCRIPTION OF THE ATTACHED DRAWINGS

FIG. 7 is a timing diagram of the head switching means applied to the inventive circuit;

DETAILED DESCRIPTION OF THE INVENTION

Figure 1:
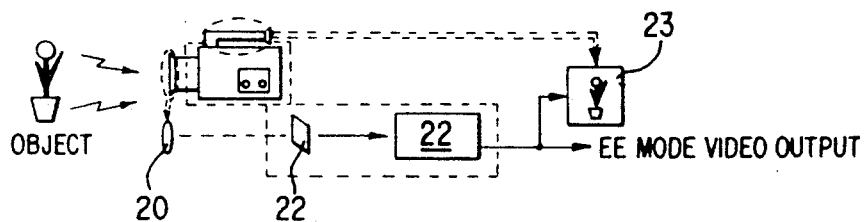
FIG. 1 is a schematic diagram for illustrating the monitoring of a conventional camcorder.
Figure 2:
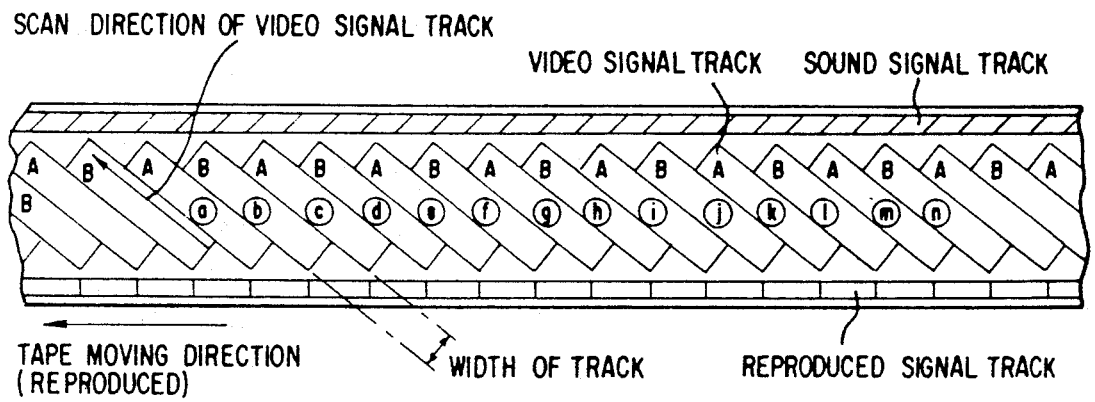
FIG. 2 illustrates the pattern of the record/playback track formed on a tape by a conventional camcorder.
Figure 3:
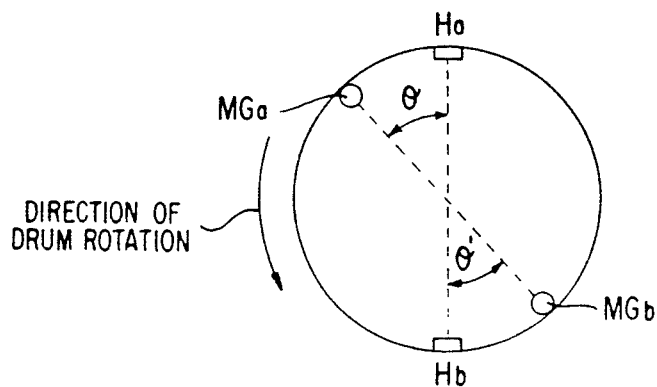
FIG. 3 illustrates the positions of the heads on a conventional head drum.
Figure 4:
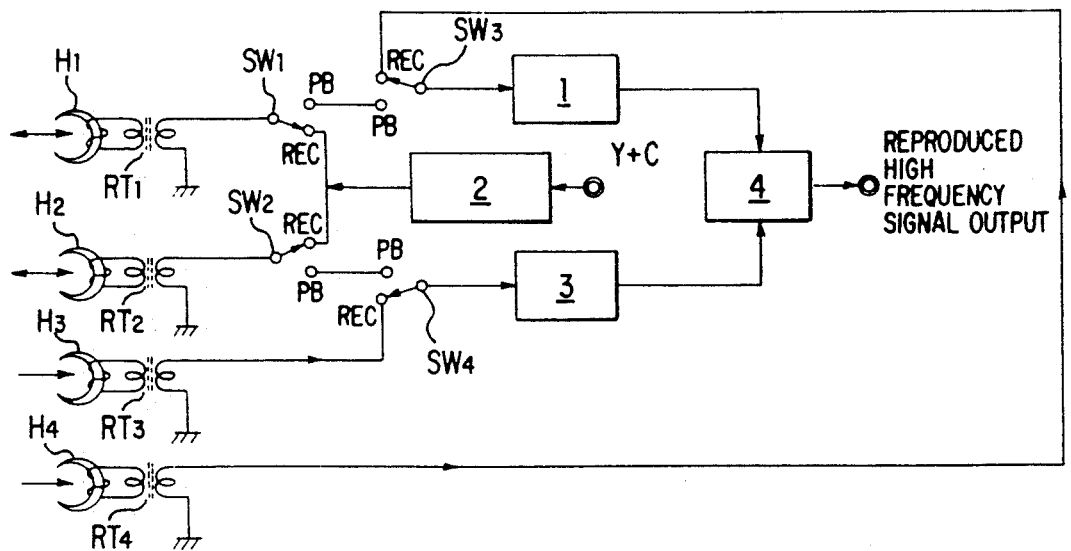
FIG. 4 is a block diagram for illustrating the heads and a control circuit for switching them according to the present invention.
Figure 5:
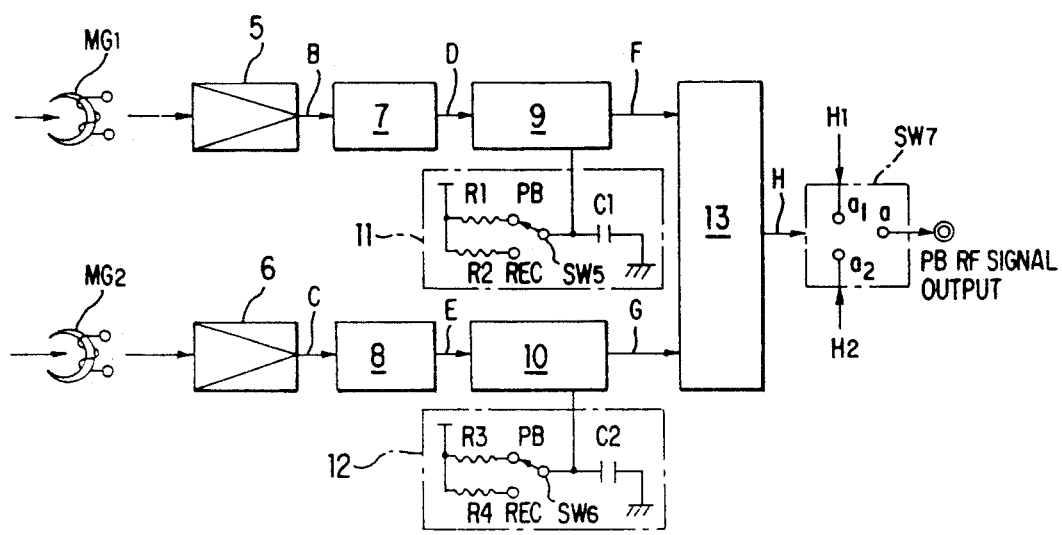
FIG. 5 is a detailed circuit diagram for illustrating the head switching means in FIG. 4.
Figure 6:
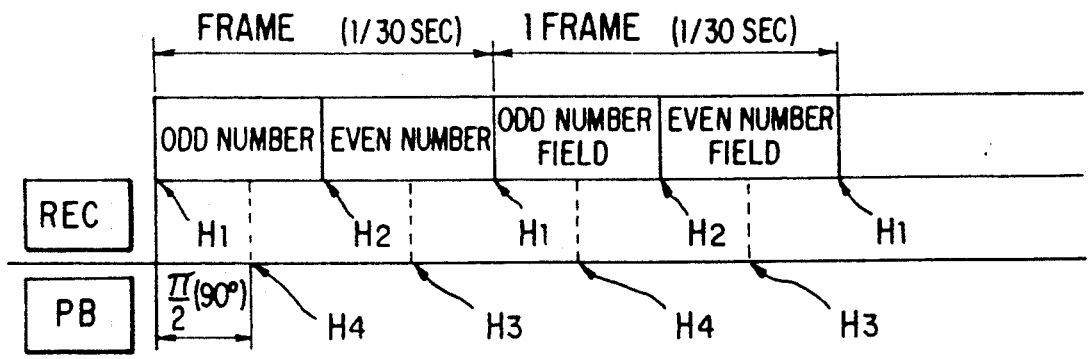
FIG. 6 is a time chart for illustrating the image record track and record monitoring track according to the present invention.

Referring to FIG. 4, a circuit used in a camcorder for monitoring the recorded state of the tape during recording by simultaneous playing back of the tape comprises first and second record/playback heads H1 and H2 mounted on a head and drum assembly for performing a record and playback of the tape, and a third and fourth playback only heads H1 and H2 mounted on the head and drum assembly between the first and second heads with an interval of 90° for exclusively performing the simultaneous playing back.

A first and second switches SW1 and SW2 is to connect the signals of the first and second heads to a first, second and third amplifiers 1, 2 and 3. The image signals picked up by the third and fourth heads H3 and H4 are delivered through third and fourth switches SW3 and SW4 to the first and third amplifiers 1 and 3. A head switching means 4 selectively switches the output signals of the first and third amplifiers 1 and 3 so as to produce playback high frequency signals.

Figure 9:
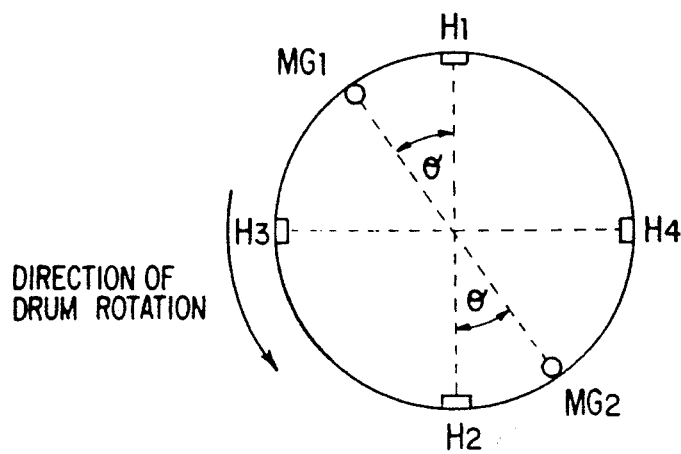
FIG. 9 illustrates the positions of the heads mounted on the head drum according to the present invention.

In addition, there are provided first and second magnets MG1 and MG2 arranged with a given interval from the first and second heads H1 and H2, as shown in FIG. 9. The magnets are to generate the head switching signals that are amplified by fifth and sixth amplifiers 5 and 6. A first and second waveform shaping circuits 7 and 8 are to shape the output signals of the fifth and sixth amplifiers 5 and 6. The first and second mono-stable oscillators 9 and 10 are to convert the output signals of the waveform shaping circuits 7 and 8 into pulses delayed by a given time. A flip-flop circuit 13 is to convert the output signals of the mono-stable oscillators 9 and 10 to head switching pulses and to produce the playback high frequency signals through a seventh switching means SW7 receiving the outputs of the first and second record/playback heads H1 and H2. The mono-stable oscillators 9 and 10 respectively have first and second delay circuits 11 and 12.

In operation, the first and second magnets MG1 and MG2 produce the head switching delay signals for delaying the head switching signals. Further, the first and second magnets MG1 and MG2 produce the switching signals for indicating the positions of the third and fourth heads H3 and H4 relative to the first and second record/playback only heads H1 and H2. In this case, the third and fourth heads H3 and H4 are respectively mounted in angular positions of $+\pi/2$ (90°) and $-\pi/2$ (−90°) between the first and second heads H1 and H2. The head drum revolution phase signals from the first and second magnets MG1 and MG2 are respectively amplified by the fifth and sixth amplifiers 5 and 6, whose outputs are respectively shaped by the first and second waveform shaping circuits 7 and 8.

The output signals of the fifth and sixth amplifiers 5 and 6 and the first and second waveform shaping circuits 7 and 8 are as shown in FIGS. 7B, 7C, 7D and 7E.

The revolution phase signals of the first and second MG1 and MG2 shaped by the first and second waveform shaping circuits 7 and 8 are converted into pulses delayed by t1 selected by the first and second delay circuits 11 and 12 connected with the first and second mono-stable oscillators 9 and 10, as shown in FIGS. 7F and 7G.

The signals as shown by FIGS. 7H and 7K produce the playback high frequency signals through the seventh switching means SW7 receiving the output signals of the first and second heads H1 and H2.

The pulses delayed by t1 generates head switching pulse signals as shown in FIG. 7H used in the flip-flop circuit 13 in playback, switching the output signals of the first and third amplifiers 1 and 3 scanned by the first and second record/playback heads H1 and H2.

In order to perform the playing back operation simultaneously with the recording operation, the delay time constants connected to the first and second mono-stable oscillators 9 and 10 are switched delayed to 8.33 msec (t2) as shown in FIGS. 7I and 7J of the control timing for switching the signals of the first and third amplifiers 1 and 3 that is the output of the flip-flop circuit 13, so that there is obtained a switching operation delayed by 90° ($\pi/2$) as shown by FIG. 7K.

Figure 8:
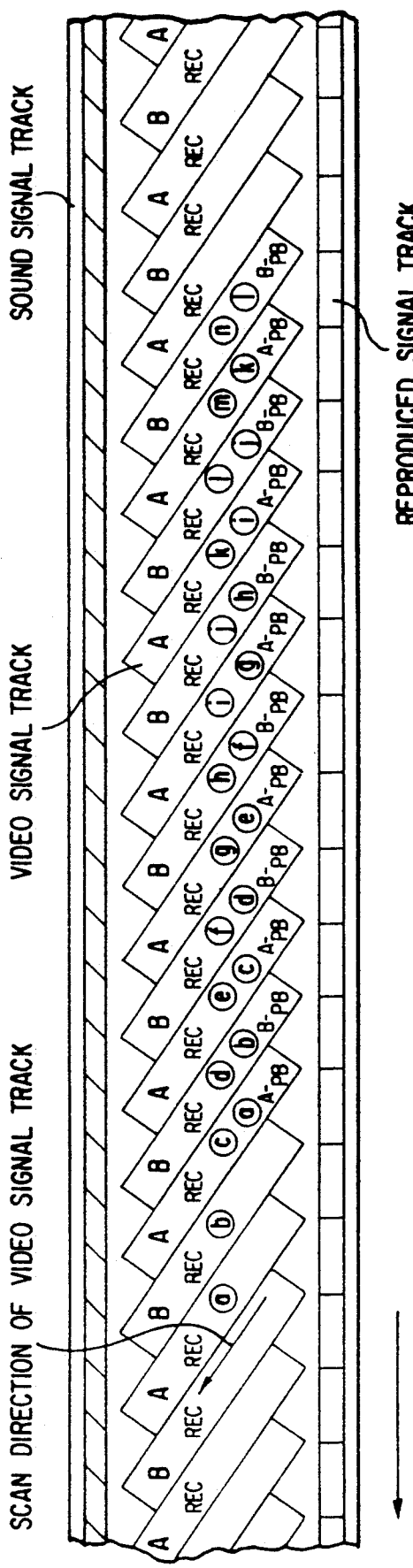
FIG. 8 illustrates the pattern of the record/playback tracks form on a tape according to the inventive circuit.

Thus, as shown in FIG. 8, the A and B record tracks are sequentially played back by the third and fourth heads H3 and H4 during the first and second record/playback heads H1 and H2 sequentially performing recording operation.

When the first head H1 has performed the recordation by ½ "A" track (or ½ odd field), the fourth head H4 plays back the "A" track on the electronic viewfinder with the delay of ½ field time (1/60 sec.).

Meanwhile, when the second head H2 has performed the recordation by ½ "B" track (or ½ even field), the third head H3 plays back the "B" track on the electronic viewfinder with the delay of ½ field time (1/60 sec.).

The delay time constants connected with the first and second mono-stable oscillators 9 and 10 are switched by the fifth and sixth switch means SW5 and SW6 of the delay circuits 11 and 12, so as to delay by 8.33 msec the timing for controlling the switching signals of the first and third amplifiers 1 and 3 outputted from the flip-flop circuit 13, thus performing switching operation delayed by 90°. In this case, the delay times t1 and t2 according to the delay time constants are determined by the resistors R1-R4 and capacitors C1 and C2 of the first and second delay circuits 11 and 12.

Namely, the time constants for the normal playing back of the recorded tape are determined by the resistor R1 and capacitor C1 of the first delay circuit 11 and the resistor R3 and capacitor C2 of the second delay circuit 12 to adjust the switching times of the heads H1 and H2, while the time constants for the simultaneous playing back during the recording are determined by the resistor R2 and capacitor C1 of the first delay circuit 11 and the resistor R4 and capacitor C2 of the second delay circuit 12 to adjust the switching times of the third and fourth heads H3 and H4.

As stated above, the inventive circuit provides means for monitoring the recorded state of the tape without stopping the recording operation, so as to immediately correct recording errors occurring during the recording.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A circuit used in a camcorder for monitoring the recorded state of a tape during recording by simultaneous playing back of said tape comprising:
   first and second record/playback heads mounted on a head and drum assembly for performing record and playback of said tape;
   a second amplifier for amplifying the signals of said first and second heads received via switches to produce chrominance record signals;
   third and fourth playback only heads mounted on said head and drum assembly between said first and second heads with a given interval for exclusively performing said simultaneous playing back;
   first and third amplifiers connected with said third and fourth heads via switches for amplifying the video signals picked up by said third and fourth heads;
   third and fourth switching means for respectively connecting the signals of said third and fourth heads to said first and third amplifiers, or the output signals of said first and second heads selected by first and second switching means to the second amplifier; and
   a head switching means for selectively switching the output signals of said first and third amplifiers.

2. A circuit used in a camcorder for monitoring the recorded state of a tape during recording by simultaneous playing back of said tape as claimed in claim 1, wherein said head switching means comprises:
   first and second magnet means for generating head switching delay signals to delay head switching signals during playing back;
   fifth and sixth amplifiers respectively connected to said first and second magnet means for amplifying revolution phase signals of said first and second magnet means;

first and second waveform shaping circuits for shaping the output signals of said fifth and sixth amplifiers;

first and second mono-stable oscillators for converting the pulse signals obtained by delaying the output signals of said first and second waveform shaping circuits for a given time; and a flip-flop circuit for converting the output signals of said first and second mono-stable oscillators to head switching pulses.

3. A circuit used in a camcorder for monitoring the recorded state of a tape during recording by simultaneous playing back of said tape as claimed in claim 2, wherein said first and second mono-stable oscillators respectively have first and second delay circuits connected thereto.

4. A circuit used in a camcorder for monitoring the recorded state of a tape during recording by simultaneous playing back of said tape as claimed in claim 3, wherein said first and second delay circuits are respectively provided with fifth and sixth switching means for adjusting respective time constants to accord with the delay timing for playing back of said second head.

5. A circuit used in a camcorder for monitoring the recorded state of a tape during recording by simultaneous playing back of said tape as claimed in claim 1, wherein said third and fourth heads are respectively arranged between said first and second heads with an interval of 90°.

* * * * *